United States Patent
Hicks et al.

(10) Patent No.: US 11,566,717 B2
(45) Date of Patent: Jan. 31, 2023

(54) JETTED CHECK VALVE

(71) Applicant: Republic Oil Tools, LLC, Oklahoma City, OK (US)

(72) Inventors: Robert Hicks, Oklahoma City, OK (US); Joshua Prather, Acton, CA (US)

(73) Assignee: Republic Oil Tools, LLC, Oklahoma City, OK (US)

( * ) Notice: Subject to any disclaimer, the term of this patent is extended or adjusted under 35 U.S.C. 154(b) by 0 days.

(21) Appl. No.: 17/383,727

(22) Filed: Jul. 23, 2021

(65) Prior Publication Data
US 2022/0025980 A1    Jan. 27, 2022

Related U.S. Application Data

(60) Provisional application No. 63/055,580, filed on Jul. 23, 2020.

(51) Int. Cl.
*F16K 15/02*  (2006.01)
*F16K 27/02*  (2006.01)

(52) U.S. Cl.
CPC ........ *F16K 15/026* (2013.01); *F16K 27/0209* (2013.01)

(58) Field of Classification Search
CPC ................. F16K 15/026; F16K 15/021; F16K 2200/202; Y10T 137/7841; E21B 34/08; F04B 39/1013
USPC ..................................................... 137/512.2
See application file for complete search history.

(56) References Cited

U.S. PATENT DOCUMENTS

| | | | | |
|---|---|---|---|---|
| 4,708,163 A * | 11/1987 | Deaton | .................... | E21B 34/08 137/460 |
| 4,736,791 A * | 4/1988 | Rorden | .................... | E21B 34/06 340/855.8 |
| 5,176,171 A * | 1/1993 | Andersson | ................ | F16K 1/44 137/512.1 |
| 5,297,579 A * | 3/1994 | McConnell | ............. | F16K 15/04 137/515.7 |
| 6,585,048 B1 * | 7/2003 | Heijnen | .................. | E21B 34/10 166/321 |

(Continued)

Primary Examiner — Kenneth Rinehart
Assistant Examiner — Nicole Gardner
(74) Attorney, Agent, or Firm — Hall Estill Law Firm

(57) ABSTRACT

A jetted check valve includes a body with an upper opening and a lower opening. The jetted check valve also includes a primary poppet slidably disposed in the body to allow the flow of fluid from the lower opening and out of the upper opening and prevent the flow of fluid from the upper opening through the lower opening. The jetted check valve further includes a secondary poppet slidably disposed at least partially within the primary poppet to allow the flow of fluid from the lower opening and out of the upper opening and prevent the flow of fluid from the upper opening through the lower opening. A method of removing debris from above a jetted check valve and permitting production fluids to flow up hole through the jetted check valve. The method includes creating a secondary flow path in the jetted check valve to remove debris that settled up hole of the jetted check valve when production of an oil and gas well has been halted. The method also includes creating a primary flow path in the jetted check valve to permit production fluids to flow up hole through the jetted check valve.

20 Claims, 4 Drawing Sheets

(56) References Cited

U.S. PATENT DOCUMENTS

| | | | |
|---|---|---|---|
| 2006/0225893 A1* | 10/2006 | Coon | E21B 34/063 |
| | | | 166/105 |
| 2012/0138168 A1* | 6/2012 | Richter | F23L 11/005 |
| | | | 137/409 |
| 2017/0152724 A1* | 6/2017 | Cote | E21B 43/121 |
| 2018/0328142 A1* | 11/2018 | Robert | E21B 34/08 |
| 2021/0062611 A1* | 3/2021 | Yeldell | E21B 33/128 |

* cited by examiner

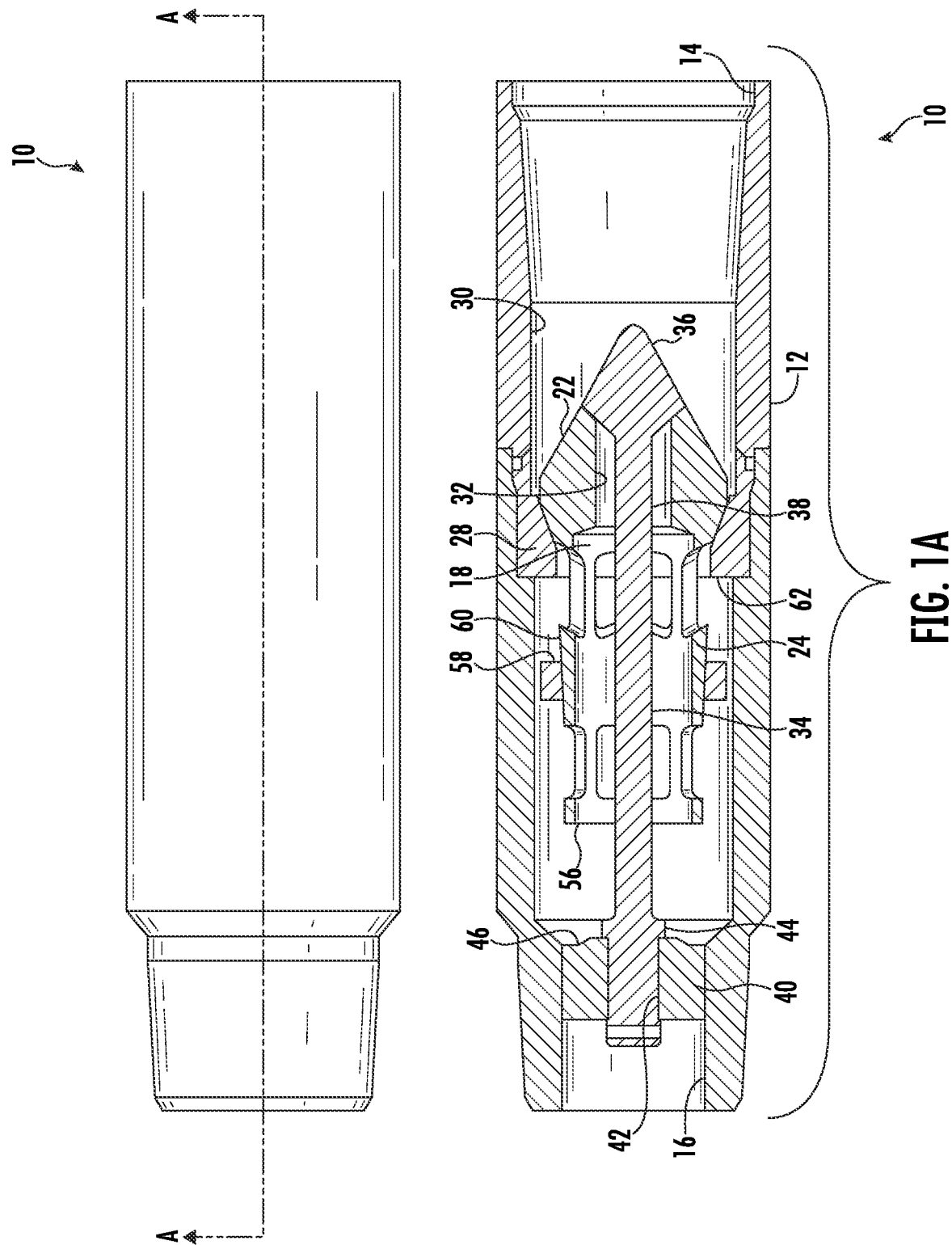

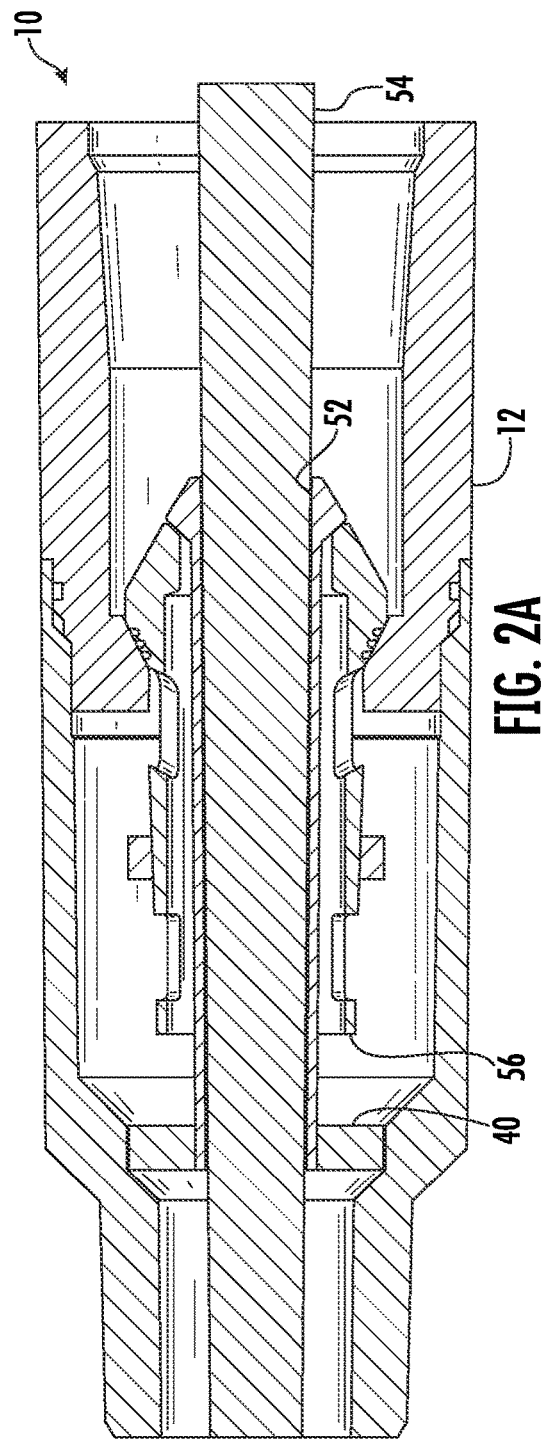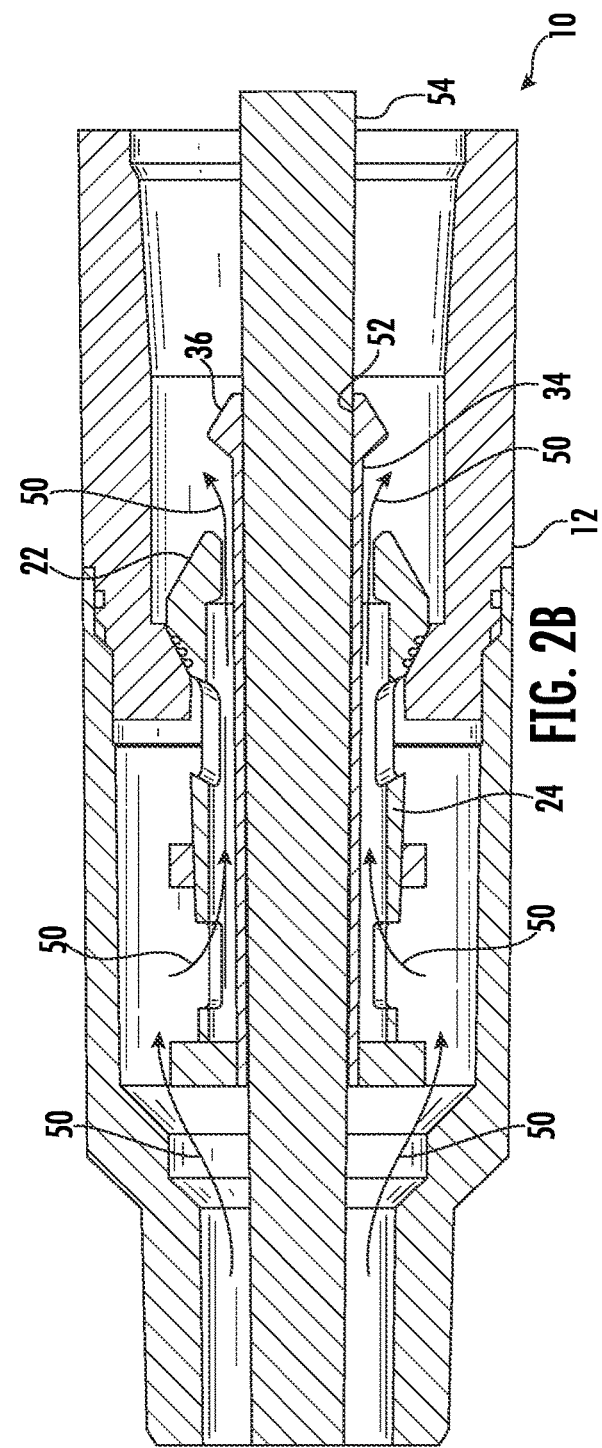

JETTED CHECK VALVE

CROSS-REFERENCE TO RELATED APPLICATIONS

The present application is a conversion of U.S. Provisional Application having U.S. Ser. No. 63/055,580, filed Jul. 23, 2020, which claims the benefit under 35 U.S.C. 119(e). The disclosures of which are hereby expressly incorporated herein by reference.

STATEMENT REGARDING FEDERALLY SPONSORED RESEARCH OR DEVELOPMENT

Not applicable.

BACKGROUND OF THE DISCLOSURE

1. Field of the Invention

The present disclosure relates to a jetted check valve for removing debris that settles above a check valve after an oil and gas pump is shut off and before the pump is restarted.

2. Description of the Related Art

A typical check valve that is disposed above a downhole pump used in oil and gas operations can have debris, such as sand, settle on top of the check valve when the downhole pump is shut off. When the downhole pump is turned back on, the check valve will not open due to solids interference preventing fluid from progressing to surface, potentially resulting in an expensive workover. Additionally, check valves have an inherent issue in wells that are slugging gas. Downhole pumps are designed to pump fluid, not gas, so when a period of high gas enters the downhole pump, the fluid weight inside the downhole pump and directly above it is light, based on the density of the gas as compared to the density of the typical fluid being produced. During this situation, the check valve checks and the downhole pump no longer has the ability to generate enough pressure, due to the light fluid, to keep the check valve open. This results in check valve chatter which occurs when the check valve will open and close repeatedly. This repeated opening and closing can damage the downhole pumping system as well as result in inconsistent flow.

Accordingly, there is a need for a check valve that can clean debris that has settled on top of the check valve during a shut down.

SUMMARY OF THE DISCLOSURE

The present disclosure is directed to a jetted check valve. The jetted check valve including a body with an upper opening and a lower opening. The jetted check valve also includes a primary poppet slidably disposed in the body to allow the flow of fluid from the lower opening and out of the upper opening and prevent the flow of fluid from the upper opening through the lower opening. The jetted check valve further includes a secondary poppet slidably disposed at least partially within the primary poppet to allow the flow of fluid from the lower opening and out of the upper opening and prevent the flow of fluid from the upper opening through the lower opening.

The present disclosure is also directed to a method of removing debris from above a jetted check valve and permitting production fluids to flow up hole through the jetted check valve. The method comprises creating a secondary flow path in the jetted check valve to remove debris that settled up hole of the jetted check valve when production of an oil and gas well has been halted. The method also comprises creating a primary flow path in the jetted check valve to permit production fluids to flow up hole through the jetted check valve.

BRIEF DESCRIPTION OF THE DRAWINGS

FIG. 1A is a cross-sectional view of a jetted check valve in a first position constructed in accordance with the present disclosure.

FIG. 2A is a cross-sectional view of another embodiment of a jetted check valve in a first position constructed in accordance with the present disclosure.

FIG. 2B is a cross-sectional view of the jetted check valve shown in FIG. 2A in a second position constructed in accordance with the present disclosure.

DETAILED DESCRIPTION OF THE DISCLOSURE

Figure 1B:
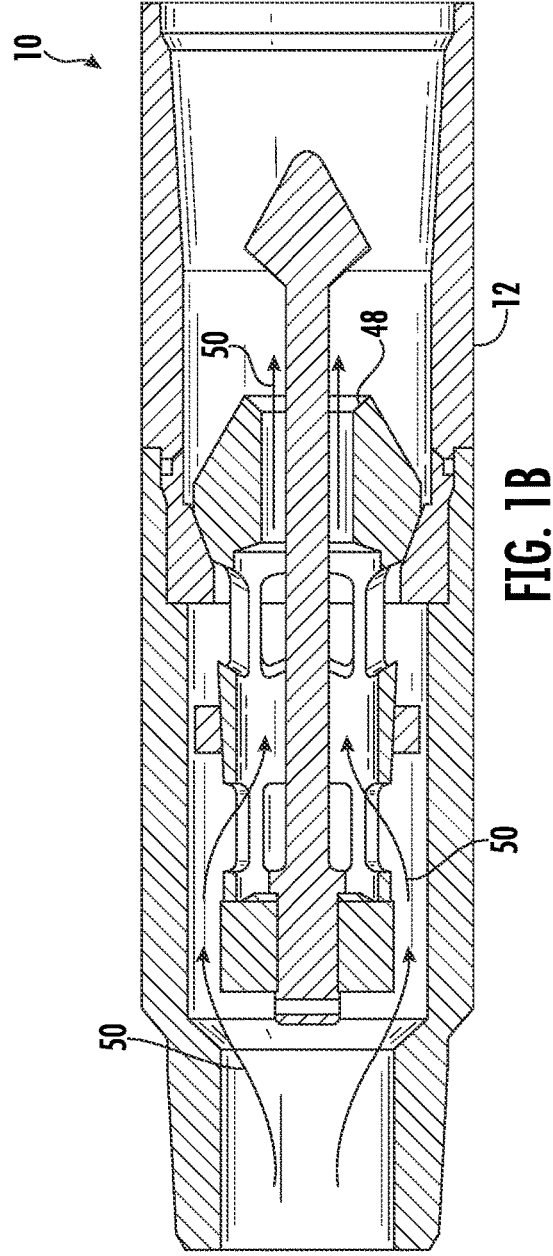
FIG. 1B is a cross-sectional view of the jetted check valve in a second position constructed in accordance with the present disclosure.
Figure 1C:
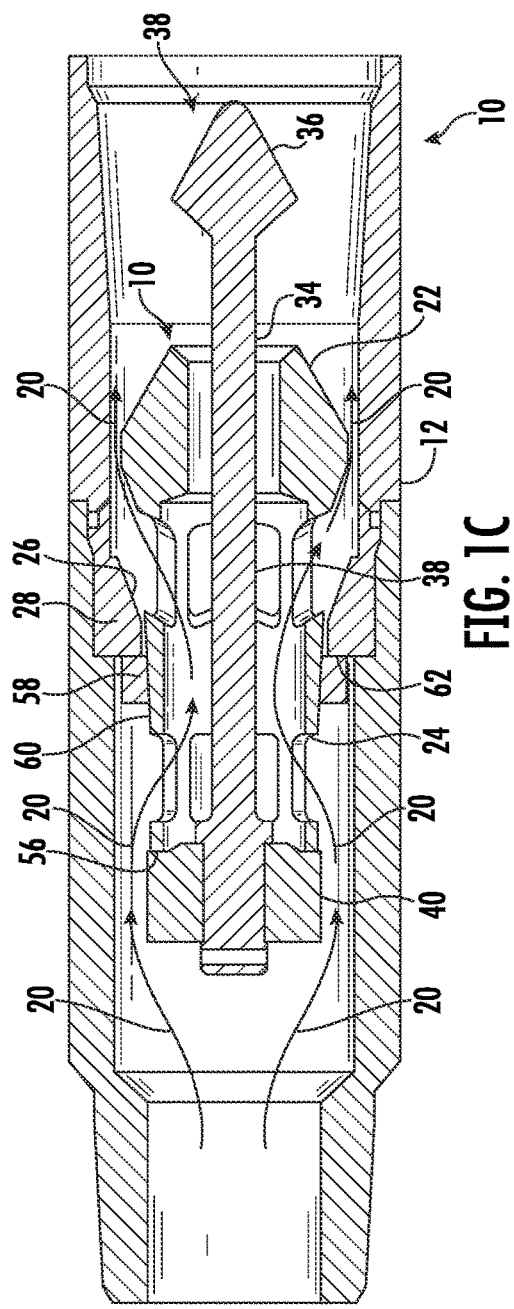
FIG. 1C is a cross-sectional view of the jetted check valve in a third position constructed in accordance with the present disclosure.

Referring now to FIGS. 1A-2B, the present disclosure relates to a jetted check valve 10 that can clean debris that settles on top of the jetted check valve 10 after a downhole pump system has been shut down. The jetted check valve 10 includes a body 12 that can be coupled to production tubing above the downhole pump in an oil and gas well. The jetted check valve 10 includes an upper opening 14 and a lower opening 16 to permit production fluids to flow through the jetted check valve 10.

The jetted check valve 10 includes a primary poppet 18 to control the flow of fluid through a primary flow path in the jetted check valve 10 depicted by arrows 20. The primary poppet 18 includes a bulbous head 22 to prevent the backflow of fluids through the primary flow path of the jetted check valve 10 and a cage 24 extending from the bulbous head 22. The bulbous head 22 of the primary poppet 18 can include a contact surface 26 that engages a shoulder 28 disposed on the inside 30 of the body 12 of the jetted check valve 10 when the jetted check valve 10 is in the closed position to prevent the back flow of fluid through the primary flow path in the jetted check valve 10. The closed position of the jetted check valve 10 occurs when the downhole pump is off and not pumping fluid up through the jetted check valve 10.

The bulbous head 22 of the primary poppet 18 includes an axial directed opening 32 disposed therein to permit a stem 34 extending from a second bulbous head 36 of a secondary poppet 38 to extend therethrough. The stem 34 extends from the second bulbous head 36, through the cage 24 of the primary poppet 18 and to a push plate 40 disposed in the lower opening 16 of the jetted check valve 10. The push plate 40 can be secured to the stem 34, or it can have an opening 42 therein to allow the stem 34 to extend into and/or through the opening 42. The stem 34 can include a flange portion 44 that engages with a top portion 46 of the push plate 40.

The bulbous head 22 of the primary poppet 18 has a rim 48 extending around the opening 32 disposed therein. The second bulbous head 36 of the secondary poppet 38 engages the rim 48 when the jetted check valve 10 is in the closed position to prevent fluid from back-flowing through a secondary flow path shown by arrows 50. The secondary flow path is between the second bulbous head 36 of the secondary poppet 38 and the rim 48 of the opening 32 of the bulbous head 22 of the primary poppet 18 and through the cage 24 of the primary poppet 18 when the jetted check valve 10 is a first open position. A second open position occurs when the bulbous head 22 is forced up and away from the shoulder 28 on the inside 30 of the body 12 of the jetted check valve 10 and the primary flow path is open.

Figure 2C:
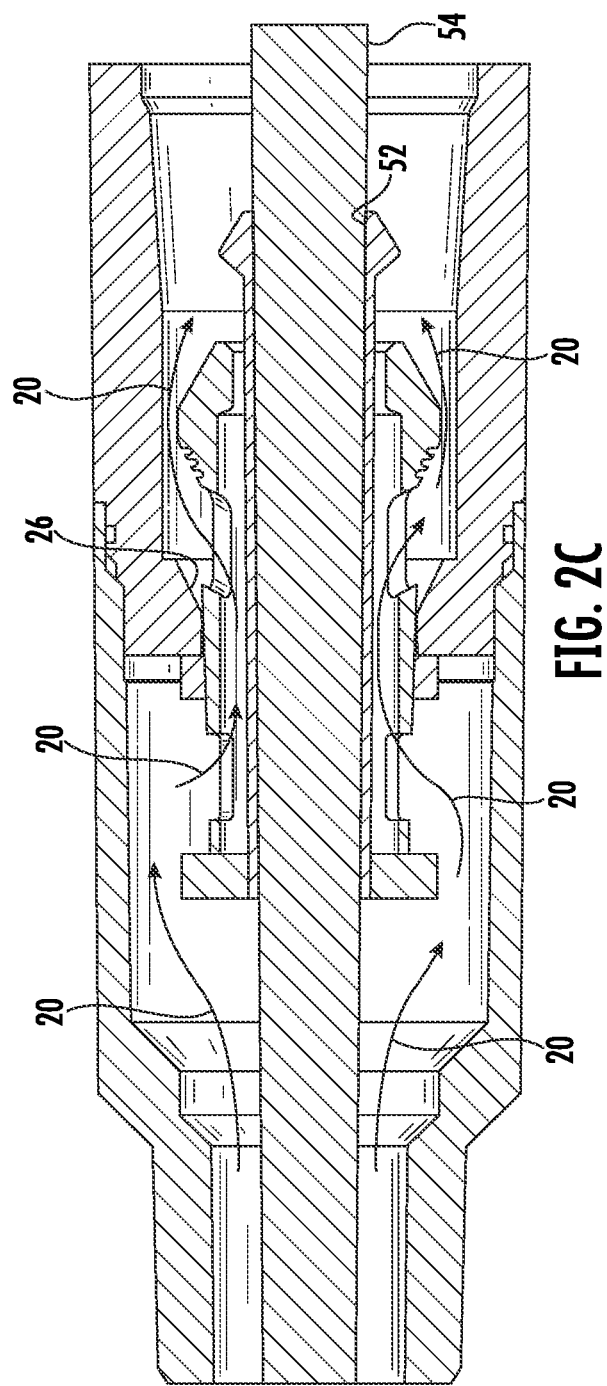
FIG. 2C is a cross-sectional view of the jetted check valve shown in FIG. 2A in a third position constructed in accordance with the present disclosure.

In another embodiment of the present disclosure shown in FIGS. 2A and 2C, the secondary poppet 38 can have an opening 52 that extends through the entire length of the secondary poppet 38 to permit a sucker rod string 54 to slidably extend therethrough when the downhole pump is a progressing cavity pump (PCP).

The present disclosure is also directed toward a method of removing debris from the top of the jetted check valve 10 after a downhole pump system has been stopped and before production of oil and gas is back to a certain level, or as production of oil and gas is restarted. When the downhole pump is shut down, the fluid column disposed above the jetted check valve 10 will force the bulbous head 22 of the primary poppet 18 downward to engage the shoulder 28 disposed on the inside 30 of the body 12 of the jetted check valve 10 to prevent fluid from flowing downward through the primary flow path. Similarly, the weight of the fluid column above the jetted check valve 10 will force the second bulbous head 36 of the secondary poppet 38 to engage the rim 48 disposed on the opening 32 in the primary poppet 18 to prevent fluid from flowing downward through the secondary flow path. Any sand or solids in the production fluid will settle on top of the jetted check valve 10.

When the downhole pump is started back up, the downhole pump forces fluid to contact the push plate 40 and move the push plate 40 upward in the jetted check valve 10. When the push plate 40 is pushed upwards in the jetted check valve 10, the push plate 40 forces the bulbous head 36 of the secondary poppet 38, via the stem 34, upward and off the rim 48 of the opening 32 in the bulbous head 22 of the primary poppet 18. As the second bulbous head 36 is forced off the rim 48 of the opening 32 in the bulbous head 22, the secondary flow path is opened creating a nozzle effect that jets fluid therethrough and forces the debris that settled on the jetted check valve 10 up and away from the jetted check valve 10. The fluid pumped upward from the downhole pump eventually forces the push plate 40 to contact a lower end 56 of the cage 24 of the primary poppet 18, which forces the primary poppet 18 off of the shoulder 28 on the body 12 of the jetted check valve 10. When the primary poppet 18 is forced off the shoulder 28 of the body 12 of the jetted check valve 10, the primary flow path of the jetted check valve 10 is opened, and production of the oil and gas well can resume. The primary poppet 18 is prevented from being pushed out of the jetted check valve 10 by a ring member 58 disposed on an outer portion 60 of the cage 24 that engages with a lower shoulder 62 disposed on the inside portion 30 of the body 12 of the jetted check valve 10.

From the above description, it is clear that the present disclosure is well-adapted to carry out the objectives and to attain the advantages mentioned herein as well as those inherent in the disclosure. While presently preferred embodiments have been described herein, it will be understood that numerous changes may be made which will readily suggest themselves to those skilled in the art and which are accomplished within the spirit of the disclosure and claims.

What is claimed is:

1. A jetted check valve, the jetted check valve comprising:
a body with an uphole opening and a downhole opening;
a primary poppet slidably disposed in the body to allow the flow of fluid from the downhole opening and out of the uphole opening and prevent the flow of fluid from the uphole opening through the downhole opening;
a secondary poppet slidably disposed at least partially within the primary poppet to allow the flow of fluid from the downhole opening and out of the uphole opening and prevent the flow of fluid from the uphole opening through the downhole opening, primary poppet and the secondary poppet each can slide from a first position to a second position in the jetted check valve and from the second position back to the first position; and
wherein a secondary flow path is opened through the primary poppet in the jetted check valve to permit fluid to flow up hole through the jetted check valve when the secondary poppet is in the second position and the primary poppet is in the first position, the up hole flow of fluid through the secondary flow path helps remove debris that has settled on top of the jetted check valve.

2. The jetted check valve of claim 1 wherein the primary poppet comprises:
a first bulbous head that can engage with a shoulder disposed on an inside portion of the body to prevent fluid from flowing downward through the jetted check valve; and
a cage that extends from the first bulbous head.

3. The jetted check valve of claim 2 wherein the secondary poppet comprises:
a second bulbous head that can engage with a rim of an opening disposed in the first bulbous head to prevent fluid from flowing downward through the primary poppet;
a stem that extends from the second bulbous head; and
a push plate attached to the stem on an opposite end of the stem from the second bulbous head, the push plate can engage a fluid disposed below the push plate to slide the second bulbous head, the stem and the push plate up hole in the jetted check valve to open a secondary flow path through the jetted check valve.

4. The jetted check valve of claim 2 wherein fluid cannot flow downward through the jetted check valve when the primary poppet and the secondary poppet are in their respective first positions.

5. The jetted check valve of claim 2 wherein the cage has a ring member that extends around at least a portion of the outer portion of the cage to engage with a lower shoulder disposed on the inside portion of the body to stop the primary poppet in the second position.

6. The jetted check valve of claim 1 wherein a primary flow path is opened around and through the primary poppet in the jetted check valve to permit fluid to flow up hole through the jetted check valve when the secondary poppet is in a third position and the primary poppet is in the second position, the up hole flow of fluid through the primary flow path allows for the production of oil and gas fluids to flow through the jetted check valve.

7. A method of removing debris from above a jetted check valve and permitting production fluids to flow up hole through the jetted check valve, the method comprising:
creating a secondary flow path in the jetted check valve to remove debris that settled up hole of the jetted check valve when production of an oil and gas well has been halted; and
creating a primary flow path in the jetted check valve to permit production fluids to flow up hole through the jetted check valve.

8. The method of claim 7 wherein the secondary flow path is created in the jetted check valve prior to creating the primary flow path in the jetted check valve.

9. The method of claim 7 wherein the jetted check valve comprises:
a body with an uphole opening and a downhole opening;
a primary poppet slidably disposed in the body to allow the flow of fluid from the downhole and out of the uphole opening and prevent the flow of fluid from the uphole opening through the downhole opening; and
a secondary poppet slidably disposed at least partially within the primary poppet to allow the flow of fluid from the lower opening and out of the upper opening and prevent the flow of fluid from the upper opening through the lower opening.

10. The method of claim 9 wherein the primary poppet comprises:
a first bulbous head that can engage with a shoulder disposed on an inside portion of the body to prevent fluid from flowing down hole through the jetted check valve; and
a cage that extends from the first bulbous head.

11. The method of claim 10 wherein the secondary poppet comprises:
a second bulbous head that can engage with a rim of an opening disposed in the first bulbous head to prevent fluid from flowing down hole through the primary poppet;
a stem that extends from the second bulbous head; and
a push plate attached to the stem on an opposite end of the stem from the second bulbous head, the push plate can engage a fluid disposed below the push plate to slide the second bulbous head, the stem and the push plate up hole in the jetted check valve to open a secondary flow path through the jetted check valve.

12. The method of claim 10 wherein the secondary flow path is opened through the primary poppet in the jetted check valve to permit fluid to flow up hole through the jetted check valve when the secondary poppet is in a second position and the primary poppet is in a first position.

13. The method of claim 12 wherein the primary flow path is opened around and through the primary poppet in the jetted check valve to permit fluid to flow up hole through the jetted check valve when the secondary poppet is in a third position and the primary poppet is in a second position, the up hole flow of fluid through the primary flow path allows for the production of oil and gas fluids to flow through the jetted check valve.

14. The method of claim 13 wherein the push plate engages with the cage of the primary poppet when the secondary poppet is in its second and third position and the primary poppet is in its first and second positions.

15. The method of claim 10 wherein the cage has a ring member that extends around at least a portion of the outer portion of the cage to engage with a lower shoulder disposed on the inside portion of the body to stop the primary poppet in the second position.

16. A jetted check valve, the jetted check valve comprising:
a body with an uphole opening and a downhole opening;
a primary poppet slidably disposed in the body to allow the flow of fluid from the downhole opening and out of the uphole opening and prevent the flow of fluid from the uphole opening through the downhole opening, the primary poppet includes a first bulbous head that can engage with a shoulder disposed on an inside portion of the body to prevent fluid from flowing downward through the jetted check valve and a cage that extends from the first bulbous head; and
a secondary poppet slidably disposed at least partially within the primary poppet to allow the flow of fluid from the downhole opening and out of the uphole opening and prevent the flow of fluid from the uphole opening through the downhole opening, the secondary poppet comprises:
a second bulbous head that can engage with a rim of an opening disposed in the first bulbous head to prevent fluid from flowing downward through the primary poppet;
a stem that extends from the second bulbous head; and
a push plate attached to the stem on an opposite end of the stem from the second bulbous head, the push plate can engage a fluid disposed below the push plate to slide the second bulbous head, the stem and the push plate up hole in the jetted check valve to open a secondary flow path through the jetted check valve.

17. The jetted check valve of claim 16 wherein the primary poppet and the secondary poppet each can slide from a first position to a second position in the jetted check valve and from the second position back to the first position wherein the primary.

18. The jetted check valve of claim 17 wherein a secondary flow path is opened through the primary poppet in the jetted check valve to permit fluid to flow up hole through the jetted check valve when the secondary poppet is in the second position and the primary poppet is in the first position, the up hole flow of fluid through the secondary flow path helps remove debris that has settled on top of the jetted check valve.

19. The jetted check valve of claim 18 wherein a primary flow path is opened around and through the primary poppet in the jetted check valve to permit fluid to flow up hole through the jetted check valve when the secondary poppet is in a third position and the primary poppet is in the second position, the up hole flow of fluid through the primary flow path allows for the production of oil and gas fluids to flow through the jetted check valve.

20. The jetted check valve of claim 16 wherein fluid cannot flow downward through the jetted check valve when the primary poppet and the secondary poppet are in their respective first positions.

* * * * *